United States Patent [19]
Rueckert et al.

[11] Patent Number: 5,538,103
[45] Date of Patent: Jul. 23, 1996

[54] FLOATING CALIPER DISC BRAKE WITH EXPANDER SPRINGS FOR THE BRAKE SHOES

[75] Inventors: Helmut Rueckert, Reinheim; Hilmar Teitge; Michael Weidenweber, both of Frankfurt am Main, all of Germany

[73] Assignee: ITT Automotive Europe GmbH, Germany

[21] Appl. No.: 256,961

[22] PCT Filed: Jan. 22, 1993

[86] PCT No.: PCT/EP93/00141

§ 371 Date: Sep. 20, 1994

§ 102(e) Date: Sep. 20, 1994

[87] PCT Pub. No.: WO93/15331

PCT Pub. Date: Aug. 5, 1993

[30] Foreign Application Priority Data

Jan. 28, 1992 [DE] Germany ............... 42 02 181.2

[51] Int. Cl.⁶ .................. F16D 55/22; F16D 66/00
[52] U.S. Cl. ............. 188/72.3; 188/1.11; 188/73.38
[58] Field of Search ............... 73/121, 129, 130, 73/768, 862.29, 862.32, 862.34, 862.36, 862.37, 862.39; 188/72.3, 73.38, 1.11 WE, 1.11E, 1.11; 267/47, 158

[56] References Cited

U.S. PATENT DOCUMENTS

| | | | |
|---|---|---|---|
| 4,410,069 | 10/1983 | Schreiunen et al. | 188/73.38 |
| 4,415,068 | 11/1983 | Gumkowski et al. | |
| 4,491,204 | 1/1985 | Dirauf et al. | 188/73.38 |
| 4,527,664 | 7/1985 | Le Marchaud | 188/73.38 |
| 4,546,298 | 10/1985 | Wickham et al. | 318/372 |
| 5,069,313 | 12/1991 | Kato et al. | |

FOREIGN PATENT DOCUMENTS

| | | |
|---|---|---|
| 1592769 | 5/1970 | France . |
| 2205005 | 8/1973 | Germany . |
| 2258050 | 5/1974 | Germany . |
| 2931071 | 3/1981 | Germany . |
| 3001632 | 1/1991 | Japan . |
| 2178807 | 2/1987 | United Kingdom . |
| 2257483 | 1/1993 | United Kingdom . |

Primary Examiner—Robert J. Oberleitner
Assistant Examiner—Chris Schwartz
Attorney, Agent, or Firm—J. Gordon Lewis; Thomas N. Twomey

[57] ABSTRACT

A floating caliper disc brake comprises a stationary brake carrier including two carrier arms protruding beyond the outer rim of a brake disc. Disposed on either side of the brake disc are brake shoes that are displaceably supported on the carrier arms and embraced by a floating caliper guided in an axially displaceable manner on the brake carrier. A spring assembly, acting on the brake shoes in the brake releasing direction after braking, creates the clearance between the brake shoes and the brake disc. The spring assembly is provided with at least one expander spring which is non-displaceably secured to a section of the carrier arm located above the outer rim of the brake disc. The expander spring is provided with at least two spring struts which, in the brake releasing direction, are in resilient abutment with the back plates of the brake shoes and thus insure a uniform distribution of the brake clearance among the brake shoes.

5 Claims, 3 Drawing Sheets

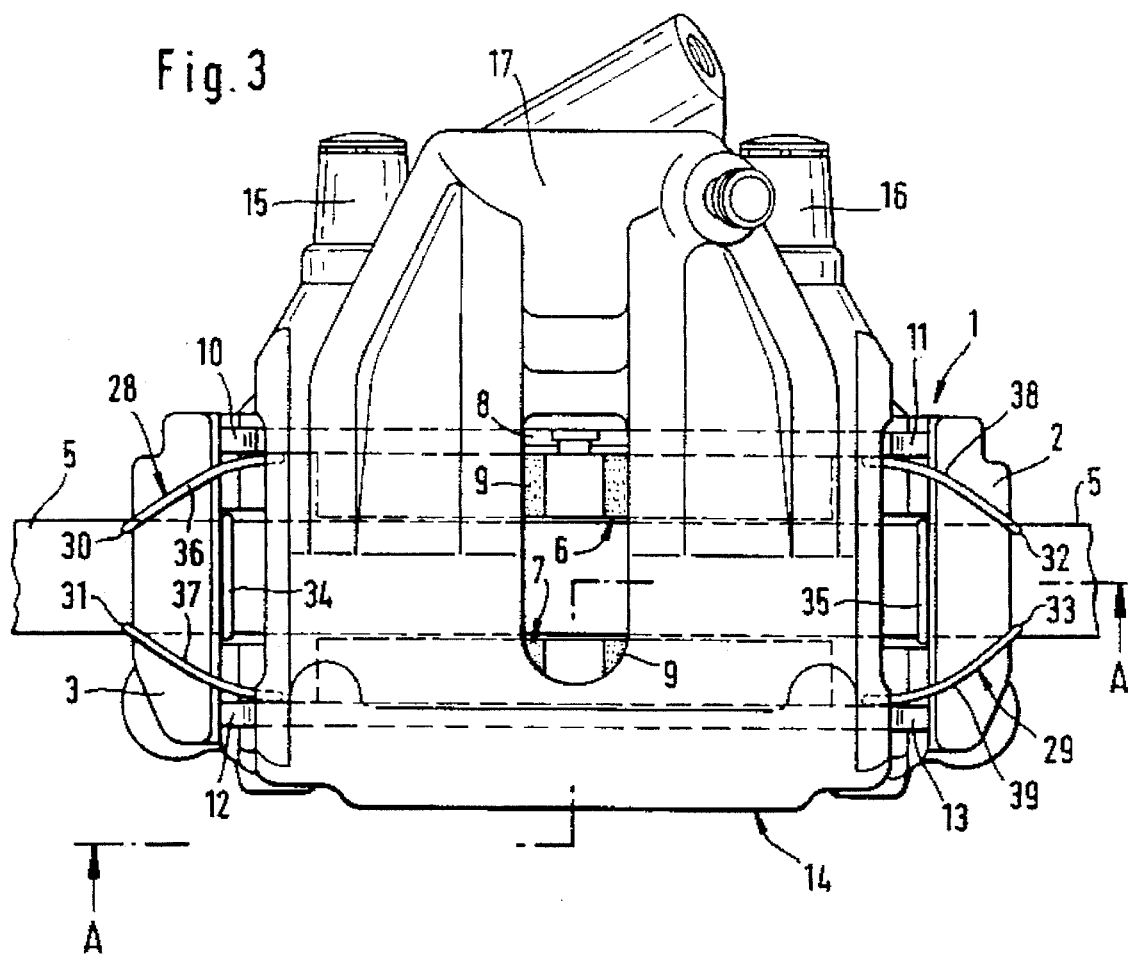
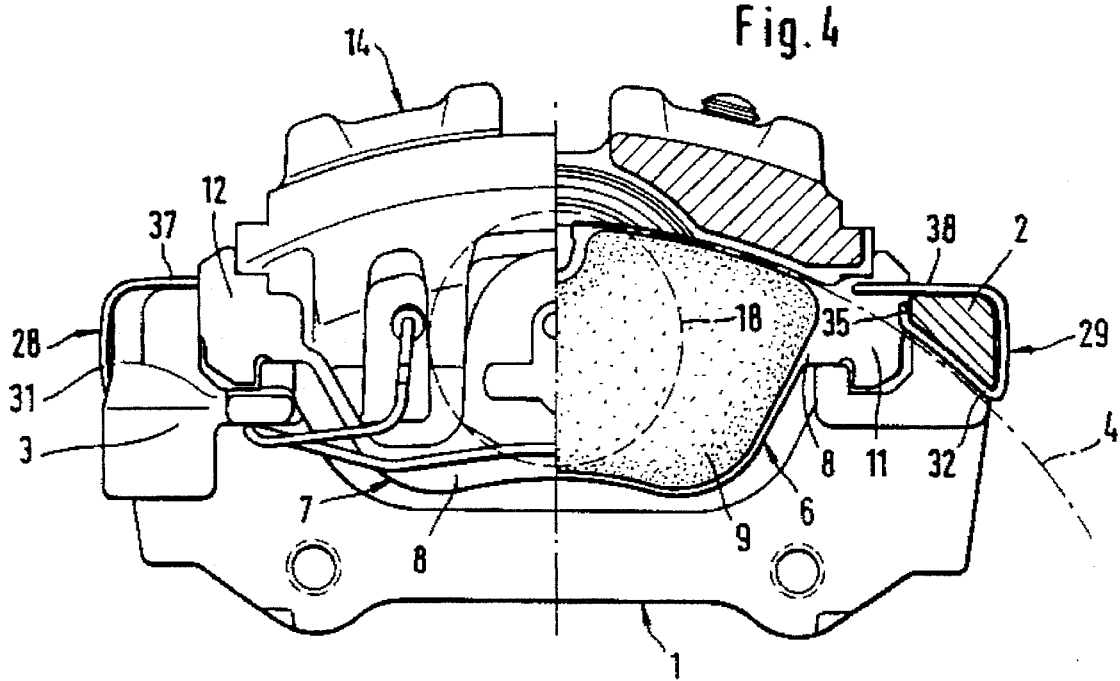

FLOATING CALIPER DISC BRAKE WITH EXPANDER SPRINGS FOR THE BRAKE SHOES

TECHNICAL FIELD

The present invention is concerned with a floating caliper disc brake wherein the brake shoes, in the brake releasing direction, are preloaded by means of expander springs to support the adjustment of a brake clearance between the brake shoe and the brake disc after applying the brake.

BACKGROUND OF THE INVENTION

A disc brake of the afore-described type is taught, for example, by DE-OS 29 31 071. In the state-of-the-art disc brake, a wire spring bent in S-type manner is located in the center of the brake. The ends of the wire spring are in abutment with the back plates of the brake shoes, thereby preloading the brake shoes in the brake releasing direction. One end of the wire spring is secured to a piston-sided brake shoe. The wire spring, hence, is "floatingly" arranged rather than secured to a stationary point of fixation.

With an increasing wear of the friction pads, the floating caliper will displace along with the outer brake shoe disposed opposite the actuator while the piston-sided brake shoe in abutment with the actuator will displace relative to the floating frame and to, the expander spring, by an amount corresponding to the aggregate of the two worn friction pad strengths. In view of the non-symmetrical arrangement of floating caliper-type disc brakes relative to the displacement paths of the brake shoes, a "floating" expander spring does not always ensure, after braking, a uniform distribution of the brake clearance among the two brake shoes.

Moreover, electrical indicators for displaying the pad wear of the brake pads are known in the art. Such indicators comprise, for example, an electrical contact provided on the brake pad, which with a pad increasingly worn, is closed or discontinued. However, an indicator of this type is suitable only to warn against worn-out brake pads rather than to continuously display the pad strength. Other means suitable for a continuous display make use, for example, of the displacement of the brake caliper vis-à-vis the brake carrier firmly anchored to the steering knuckle of the vehicle, which grows with an increasing pad wear. For this purpose, usually, a variable electrical resistor having a displaceable slider is used. The disadvantage involved with the latter means resides in the relatively complex design thereof causing rather high manufacturing costs.

It is the object of the invention to provide a floating caliper disc brake having uniform distribution of the brake clearance among the brake shoes.

Another object of the invention is to provide a low-cost electrical pad wear indicator.

SUMMARY OF THE INVENTION

An expander spring is attached on a stationary point of the disc brake to a carrier arm of the brake carrier. Respectively two spring struts extend from the point of attachment symmetrically disposed above the outer rim of the brake disc into the brake, where they are in abutment with the back plates of the brake shoes, preloading the same in the brake releasing direction. In view of their stationary fixation, the expander spring is not displaced in whole if, with an increasing friction pad wear, the floating caliper and, relative thereto, the piston-sided brake shoe are displaced in opposite axial directions. It is only the spring struts of the expander spring that are axially displaced symmetrically with respect to one another. The arrangement according to the invention insures a uniform distribution of the brake clearance among the two brake shoes.

Preferred embodiments of the invention are particularly advantageous in view of their simple, low-cost and functional designs.

In a preferred embodiment means is provided for protecting correspondingly designed expander springs for use in a disc brake according to the invention.

A further embodiment includes the use of a strain gauge for permitting a continuous display of the pad wear involving extremely low manufacturing efforts. With an increasing pad wear, the brake pads displace via-à-vis the brake carrier to which the expander spring is clamped, with the spring struts being deflected and also the mid-area of the mounting section being bent. The said bending will cause a change in resistance in the cemented strain gauge which change is continuously indicated by a calibrated electrical display, thereby enabling the driver of the automotive vehicle to permanently read the remainder of the strength.

Further examples of embodiment of the invention will now be described in greater detail with reference to the drawings.

BRIEF DESCRIPTION OF THE DRAWINGS

FIG. 3 is a plan view of a second form of embodiment of a floating caliper-type disc brake with a spring assembly according to the invention.

FIG. 4 is a partial sectional side view along line A—A of FIG. 3.

Figure 2:
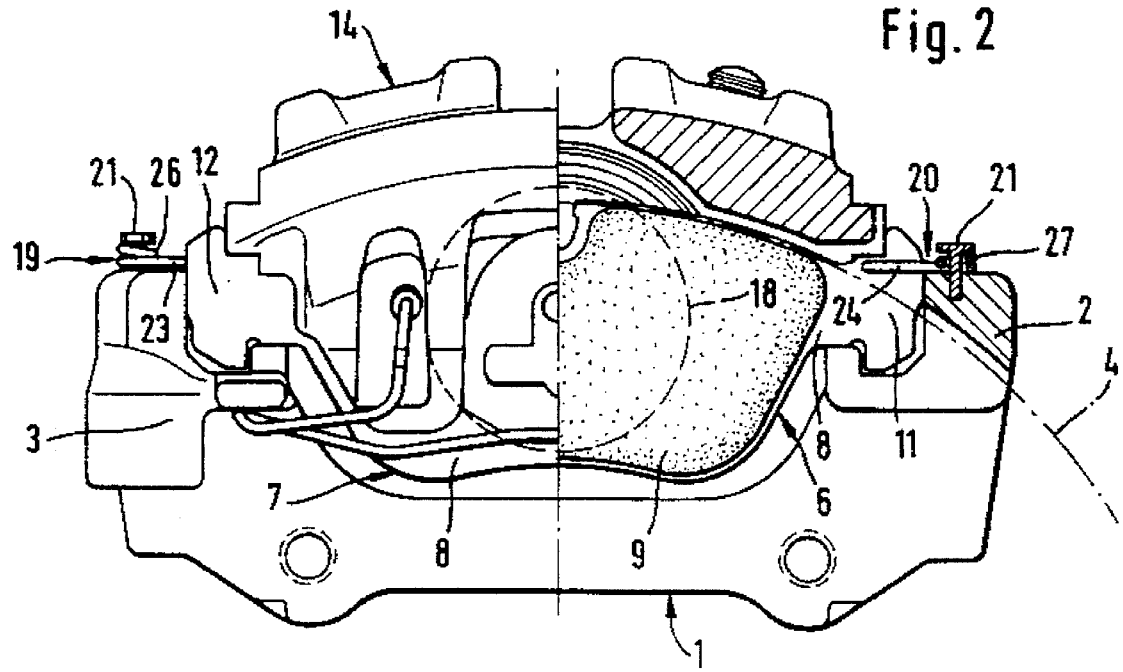
FIG. 2 is a partial sectional side view along line A—A of FIG. 1.
Figure 6:
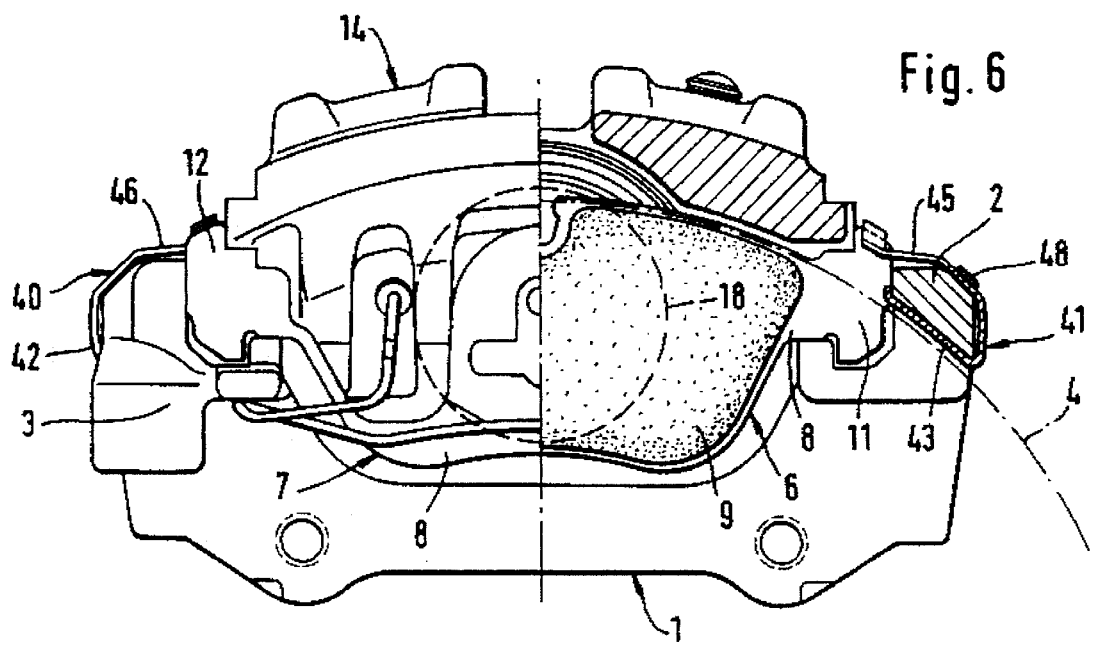
FIG. 6 is a partial sectional view along line A—A of FIG. 5.

The floating caliper disc brake of the present invention comprises a stationary brake carrier 1 the two carrier arms 2,3 of which protrude beyond the outer rim 4 of a brake disc 5. Provided on either side of the brake disc 5 are two brake shoes 6,7 respectively comprising a back plate 8 and a friction pad 9 secured to the back plate 8. The back plates 8 are provided with hammer head-type projections 10,11,12,13 deflecting in the circumferential direction and being guided in an axially displaceable manner on the carrier arms 2,3 for supporting the brake shoes 6,7. The friction forces developed on the brake shoes 6,7 during braking are transferred, through the projections 10,11,12,13, to the carrier arms 2,3. A floating caliper 14, through two bolt guides 15,16, is guided in an axially displaceable manner on the brake carrier 1. The floating caliper 14 embraces the brake shoes 6,7 and the outer rim 4 of the brake disc. 5 and is provided with an actuator 17 comprising a brake piston 18 of the type as shown in FIGS. 2,4 and 6 in broken lines. Upon operation of the actuator 17, the piston-sided brake shoe 6, through brake piston 18, is forced directly against the brake disc 5 while the opposite outer brake shoe 7, in view of a displacement of the floating caliper 14, is forced indirectly against the brake disc 5.

When the brake is not applied, a clearance must be adjusted between the friction faces of the brake shoes 6,7 and the brake disc 5 to avoid inadvertent rubbing of the friction pads 9 against the brake disc 5. As the piston-sided brake shoe 6 is to be moved along with piston 18 whereas the opposite brake shoe 7 is to be moved along with the entire floating caliper 14, it may well be possible that differently strong restoring forces are required for adjusting the clearance on the brake shoe 6 and the brake shoe 7.

Figure 1:
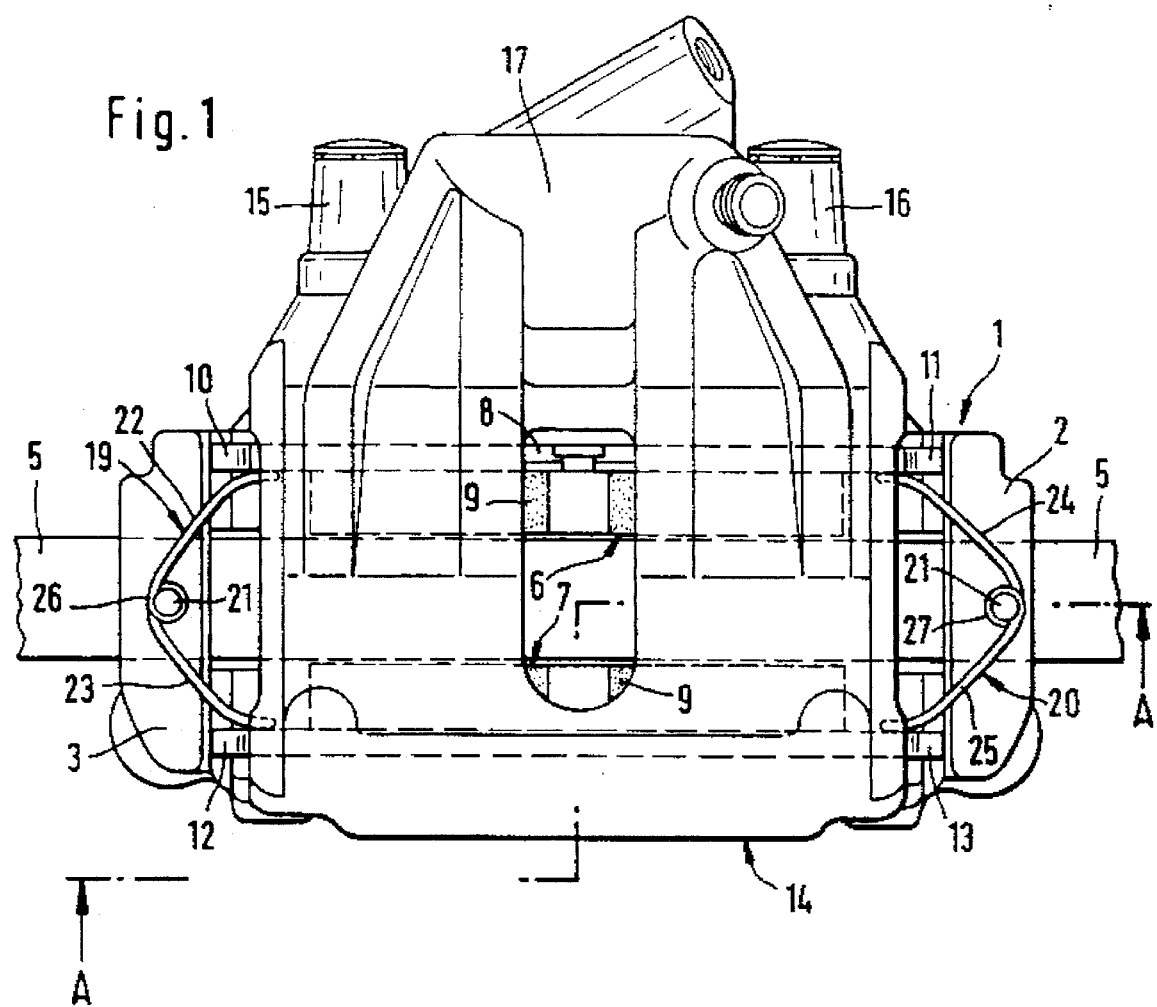
FIG. 1 is a plan view of a first embodiment of a floating caliper disc brake provided with a spring assembly according to the invention.

In a first form of embodiment of the invention as shown in FIGS. 1 and 2, two expander springs 19,20 are provided for adjusting the clearance, which are fixed to the carrier arms 2,3 by means of notch-type nails 21. Such nails are located respectively in a section of the carrier arms 2,3 disposed above the outer rim 4 of the brake disc 5 and, relative to the thickness of the brake disc 5 are arranged midway. The expander spring 19,20 are integrally formed of spring wire and respectively are provided with two spring struts 22,23, and 24,25 emerging from a mounting section 26,27 wound in loop-type manner about the notch-type nail 21. The spring struts 22,23 and 24,25, respectively, are disposed in V-type relationship with respect to one another and, with the free ends thereof are in abutment with the hammer head-type projections 10,12 and 11,13, respectively, of the back plates 8. The expander springs 19,20 are preloaded such that the spring struts 22,23,24,25 thereof, in the brake releasing direction, exert spring forces on the projections 10,11,12,13 of the back plates 8. Hence, when the brake is not applied, the brake shoes 6,7, through the expander springs 19,20, are pushed away from the brake disc 5 in the axial direction, with a clearance being adjusted between the friction faces of the brake shoes 6,7 and the brake disc 5. In the event that the force required for displacing the piston-sided brake shoe 6 differs from the force required for displacing the opposite brake shoe 7, it will be feasible to provide the spring struts 22,24 with a rigidity differing from that of the spring struts 23,25. This can be done, for example, in that the shape or thickness of the spring struts 22,24 differs from the spring struts 23,25. Advantageously, spring struts 22,23,24,25 with the free ends thereof, are in abutment with sections of the hammer head-type projections 10,11,12,13 which are located, in the radial direction, externally of the rim 4 of the brake disc 5. This arrangement ensures that the spring struts 22,23,24,25, even with the friction pads 9 fully worn, cannot get into contact with the brake disc 5. To fully exclude the risk of a slippage of the spring struts 22,23,24,25 during driving, and to prevent them from rubbing against the brake disc 5, it will be feasible to provide depressions, orifices, bores, grooves or the like, within the areas of the projections 10,11,12,13 intended for abutment of the spring struts 22,23,24,25. These depressions, etc. are preferably engaged by the free ends of the spring struts 22,23,24,25.

In a second form of embodiment of the invention as shown in FIGS. 3 and 4, two expander springs 28,29 are provided which are clamp to the carrier arms without requiring any special means of attachment. The expander springs 28,29, equally, are bent from respectively one piece of spring wire. Each of the expander springs 28,29 comprises two substantially identical wire legs 30,31 and 32,33, respectively, interconnected by means of a connecting section 34,35 and folded up in hook-type manner. The wire legs 30,31,32,33 embrace the circumference of the carrier arms 2,3 within an area disposed above the outer rim 4 of the brake disc 5, thereby firmly clamping the expander springs 28,29 to the carrier arms 2,3. The wire legs 30,31 and 32,33, respectively, and the connecting section 34 and 35, respectively, protrude into a free area of the carrier arms 2 and 3, respectively, intended for passage of the brake disc 5, with the length of the connecting section 34 and 35, respectively, being so adjusted to the axial width of the free area as to block the expander springs 28,29 against slippage in the axial direction. The wire legs 30,31,32,33, toward the free wire ends, pass over into spring struts 36,37,38,39 in abutment with the projections 10,11,12,13 of the back plates 8. Concerning the shape, operation and design of the spring struts 36,37,38,39, the same applies as that discussed in conjunction with spring struts 22,23,24,25.

Figure 5:
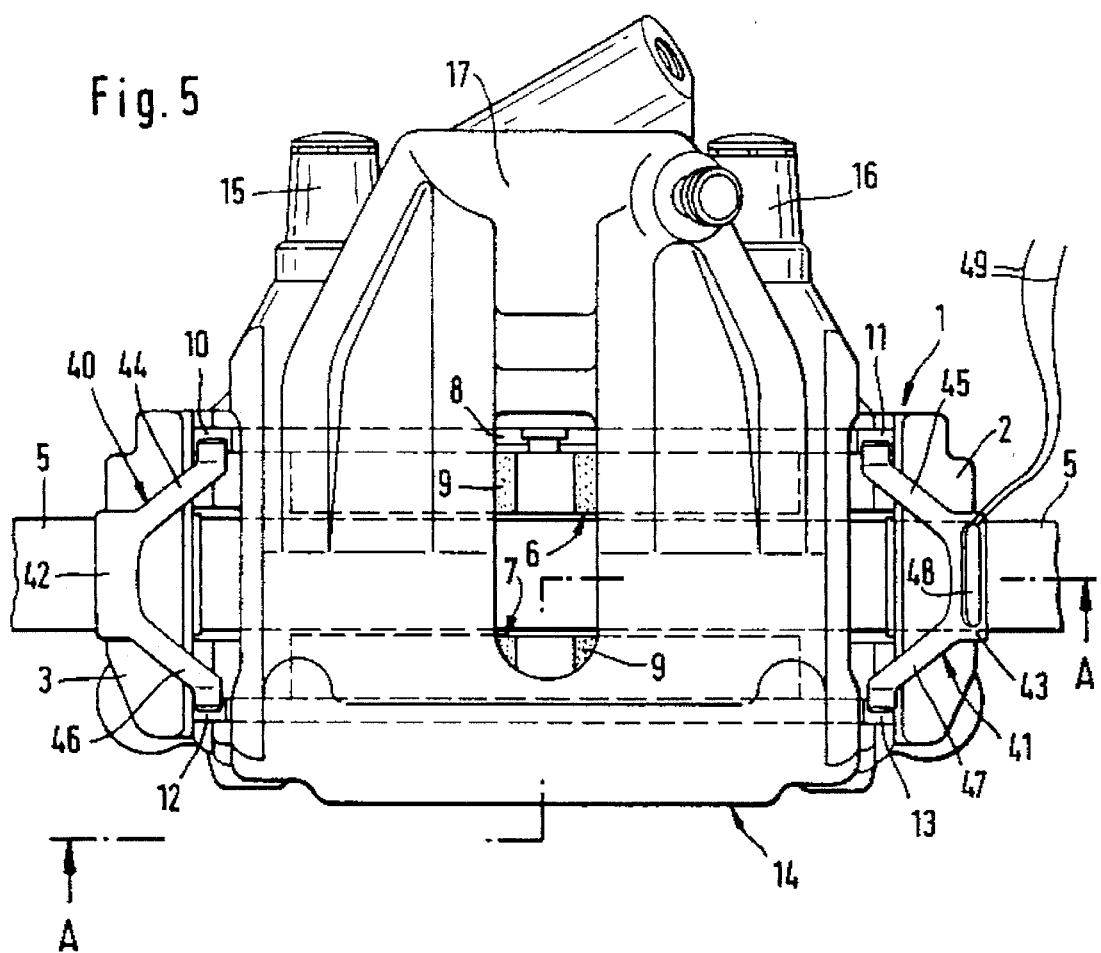
FIG. 5 is a plan view of another form of embodiment of the invention provided with an indicator for pad wear indication.

FIGS. 5 and 6 show another form of embodiment of the invention in which, again, two expander springs 40,41 are clamped to the carrier aims 2,3. The expander springs 40,41 are stamped from a spring sheet metal and are of a bent configuration. Respectively a pair of spring struts 44,45,46, 47 emerge from a mounting section 42,43 embracing the carrier arm 2,3, which spring struts deflect in V-shaped manner with respect to one another. The end 3 of the spring struts 44,45,46,47 are respectively slightly bent off and are superposed, in resiliently inclined manner, on the projections 10,11,12,13 of the brake shoes 6,7 so that a force component directed both radially inwardly and axially outwardly is formed. The way of operation and fixation of the expander springs 40,41 otherwise correspond to those of the preceding form of embodiment.

The mounting section 43 of the expander spring 41 is provided with a cemented strain gauge 48 which, through electrical feed lines 49, is in communication with an electrical pad wear indicator. The expander spring 40 may, of course, be provided with an additional strain gauge. Also, it is within the scope of the invention to use a plural number of strain gauges to be fixed to various points of the expander springs 40,41, such as, for example, to the spring struts 44,45,46,47.

What is claimed is:

1. A floating caliper disc brake, comprising:

a stationary brake carrier having two carrier arms protruding beyond an outer rim of a brake disc;

brake shoes disposed on either side of said brake disc, said brake shoes being displaceably supported on said carrier arms;

a floating caliper guided in axially displaceable manner on said brake carrier, embracing said brake shoes and including an actuator intended for forcing said brake shoes against said brake disc; and a spring assembly axially acting, in a brake releasing direction, on said brake shoes and causing, after braking, a clearance between said brake shoes and said brake disc, said spring assembly containing at least one expander spring which is nondisplaceably fixed to one of said carrier arms of said brake carrier, said fixation being effected on a section of said carrier arm located above said outer rim of said brake disc, said at least one expander spring being of bent configuration and comprising a mounting section embracing said section of said carrier arm, and at least two substantially identical spring struts which emerge therefrom, deflect in V-type manner with respect to one another and in substantially symmetrical relationship to a brake disc plane, and are in resilient abutment in an axial direction with said brake shoes, wherein said at least one expander spring includes an electrical strain gauge in communication with an electrical indicator to thereby enable said brake shoes wear to be continuously displayed.

2. The disc brake according to claim 1, wherein the expander spring is integrally formed of spring wire.

3. The disc brake according to claim 1, wherein said electrical strain gauge is fastened to said at least one expander spring by way of cementing.

4. The disc brake according to claim 1, wherein said brake shoes are provided respectively with a friction pad and a back plate and said resilient abutment of said at least two substantially identical spring struts with said brake shoes is effected with said brake plates thereof.

5. A spring for use in a floating caliper disc brake system, comprising:

a mounting section having first and second ends, a strain gauge disposed intermediate said first and second ends of said mounting section and being in a physical connection therewith, wherein said strain gauge is adapted to measure the strain induced in said spring upon movement of said caliper thereby monitoring and indicating the state of wear of a brake pad utilized in said system.

* * * * *